United States Patent
Reeves et al.

(10) Patent No.: US 8,666,438 B1
(45) Date of Patent: Mar. 4, 2014

(54) MANAGING COMMUNICATIONS WITH A CONTENT PROVIDER

(75) Inventors: Raymond Emilio Reeves, Olathe, KS (US); Simon Youngs, Overland Park, KS (US); Gary Duane Koller, Overland Park, KS (US); Mark D. Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 46 days.

(21) Appl. No.: 13/240,542

(22) Filed: Sep. 22, 2011

(51) Int. Cl.
*H04W 4/00* (2009.01)
*H04L 29/06* (2006.01)
*G06F 15/16* (2006.01)
*G06F 15/173* (2006.01)
*G06F 7/04* (2006.01)

(52) U.S. Cl.
USPC ........... 455/466; 709/219; 709/225; 709/209; 709/203; 709/238; 726/2; 455/414.3

(58) Field of Classification Search
USPC ................................................ 455/466, 435
See application file for complete search history.

(56) References Cited

U.S. PATENT DOCUMENTS

| | | | |
|---|---|---|---|
| 7,299,033 B2 * | 11/2007 | Kjellberg et al. | 455/414.1 |
| 2004/0139204 A1 * | 7/2004 | Ergezinger et al. | 709/229 |
| 2004/0148092 A1 * | 7/2004 | Kim et al. | 701/200 |
| 2004/0249943 A1 * | 12/2004 | Punaganti Venkata et al. | 709/225 |
| 2009/0177741 A1 * | 7/2009 | Tian | 709/203 |
| 2009/0328144 A1 * | 12/2009 | Sherlock et al. | 726/2 |
| 2012/0054314 A1 * | 3/2012 | Son et al. | 709/219 |

* cited by examiner

*Primary Examiner* — Timothy Pham

(57) ABSTRACT

The invention is directed to methods and systems for managing communications between a user of a mobile device and a content provider. Registration information is received from a mobile device indicating that a communications manager is authorized to communicate with the content provider and act on behalf of the mobile device with respect to blocking and unblocking certain messages received from the content provider. The content provider registers with the communications manager so that the communications manager knows specific codes and methods for communicating with the content provider. Modified user preferences are received from the mobile device, and these are communicated to the content provider by the communications manager.

18 Claims, 4 Drawing Sheets

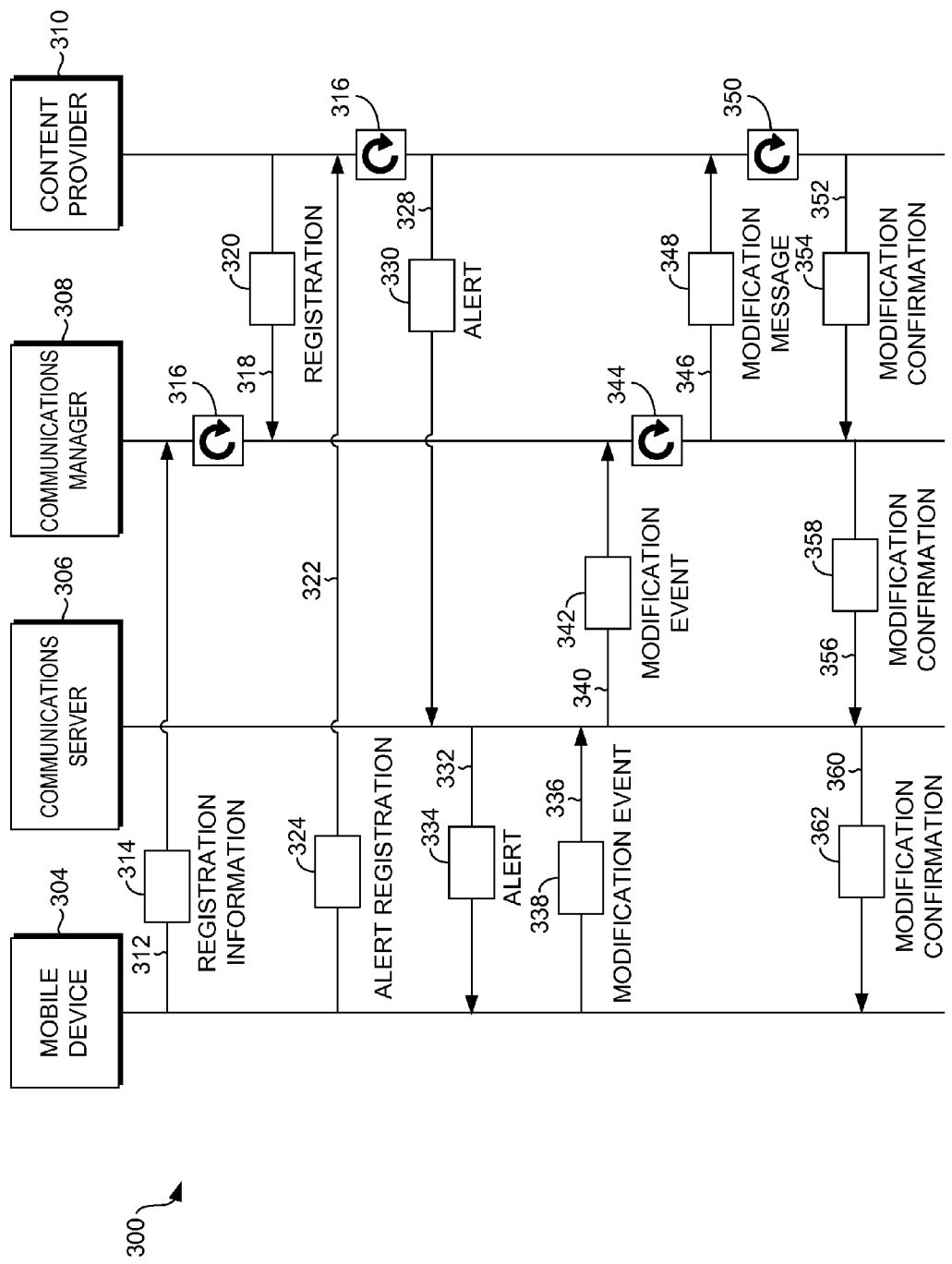

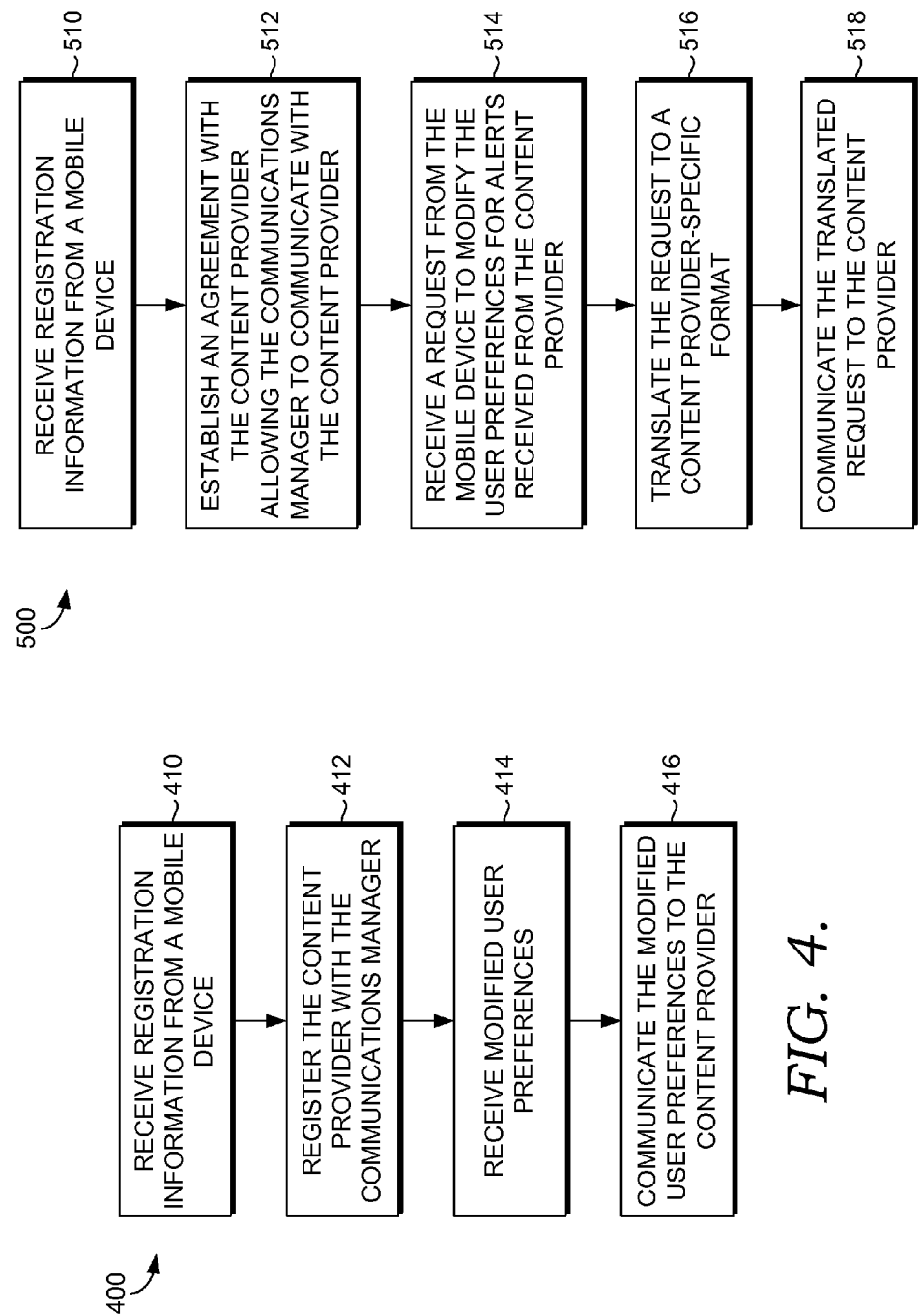

MANAGING COMMUNICATIONS WITH A CONTENT PROVIDER

SUMMARY

A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, a system for managing communications between a mobile device and a content provider, and specifically managing messages (e.g., texts, alerts, notifications) received by the mobile device from a content provider. Content providers may be services, applications, websites, or the like that provide content to a mobile device. For instance, a content provider as used herein may be a social media networking site, a gaming application, a weather application, etc. A communications manager receives a registration with the content providers, and also receives a registration with the mobile device indicating which content providers the communications manager is authorized to communicate with on behalf of the mobile device. The mobile device may send a block or unblock message to the communications manager, and the communications manager may translate the message to a content provider-specific format and deliver the message to the content provider.

BRIEF DESCRIPTION OF THE SEVERAL VIEWS OF THE DRAWINGS

Illustrative embodiments of the present invention are described in detail below with reference to the attached drawing figures, and wherein:

FIG. 3 depicts a flow diagram illustrating a method for managing communications between a user and a content provider, in accordance with an embodiment of the present invention;

FIG. 4 depicts a flowchart illustrating a method for managing communications between a user and a content provider, in accordance with an embodiment of the present invention; and FIG. 5 depicts a flowchart illustrating a method for managing communications between a user and a content provider, in accordance with an embodiment of the present invention.

DETAILED DESCRIPTION

Figure 1:
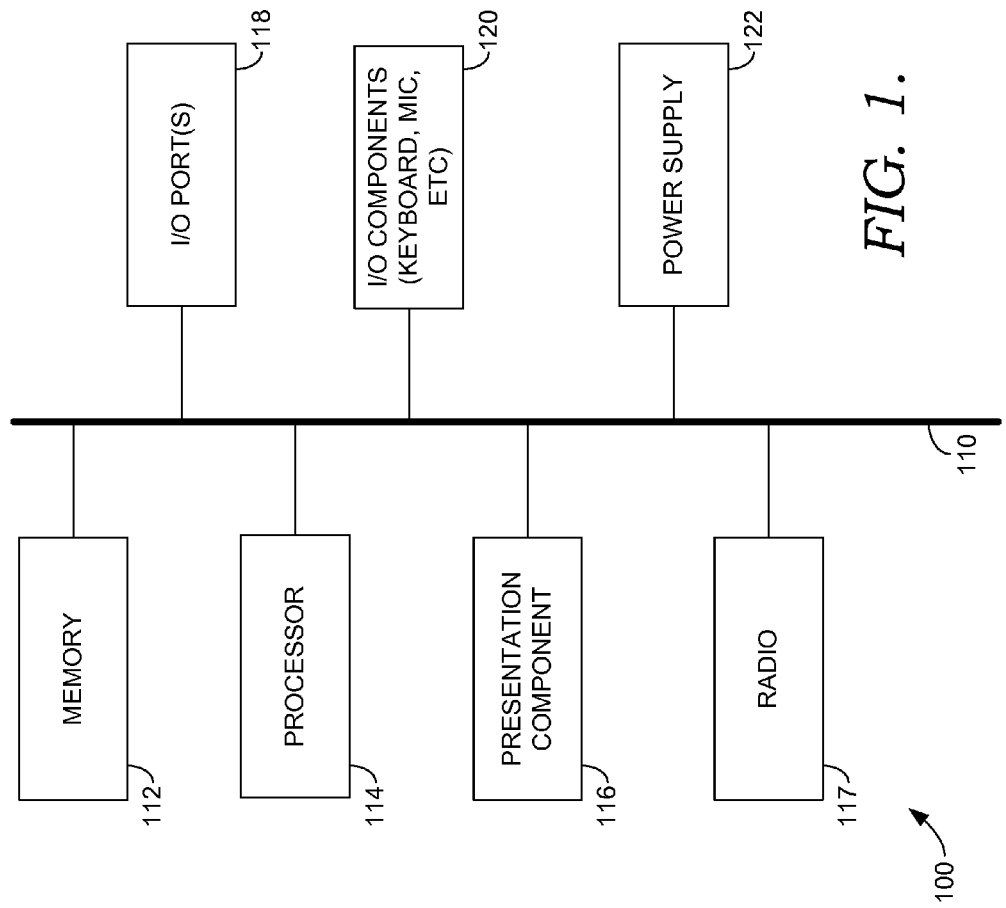
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AAA | Authentication, Authorization, and Accounting |
| BTS | Base Transceiver Station |
| CDMA | Code Division Multiple Access |
| FA | Foreign Agent |
| GGSN | GPRS Gateway Support Node |
| GPRS | General Packet Radio Service |
| GSM | Global System for Mobile communications (Groupe Spécial Mobile) |
| HA | Home Agent |
| HTTP | Hypertext Transfer Protocol |
| IP | Internet Protocol |
| LED | Light Emitting Diode |
| PDA | Personal Data Assistant |
| PDSN | Packet Data Serving Node |
| RNC | Radio Network Controller |
| SMS | Short Messaging Service |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed toward managing communications between mobile devices and content providers, and specifically opting in and out of messages sent from content providers to mobile devices. Embodiments of the present invention provide users with an efficient and simple method to opt in or opt out or otherwise block messages (e.g., premium short messaging services (SMS) text messages) from various sources, such as one-time charge content, paid-for subscription services, and free social networking sites. Embodiments may provide end users with a common interface that will support communication to various content providers, senders, or originators of messages to the handset. A communications manager, described in more detail herein, accepts opt in and opt out requests from end users based on, for instance, SMS destination addresses or short-codes. The communications manager further translates these addresses (e.g., SMS-specific addresses) into specific content providers and customer service accounts to communicate directly with the impacting content providers or other parties on behalf of the customer to perform service-specific configuration and preference setting requests.

Embodiments of the present invention simplify the process for the end user of opting in and out of receiving certain messages from content providers and will improve the accuracy of blocking content provider notifications based on data captured by the messaging carrier where the messaging subscriber expresses an intent to block certain messages from specific sources. Embodiments also translate subscriber terminal identifiers and termination (short) code assigned to the source content providers into mobile notification preference-setting commands specific to the offending service or content provider on behalf of the messaging subscriber (e.g., end user). The system will provide end users, carriers, and the originators a method for tracking and implementing blocking/unblocking message requests triggering service provider preference changes on behalf of the end users. This will then reduce the instance of false blocks where end users have the messaging carrier process and ignore messages from specific sources that would otherwise support or expose a mechanism to stop messages altogether on behalf of the user, improve the implementation time for requested blocks, and provide carriers with valuable information regarding block requests that ultimately result in customer experience as well as capacity and performance improvements.

In a first aspect of the present invention, computer-readable media having computer-executable instructions embodied thereon that, when executed, enable a computing device to perform a method of managing communications between a user and a content provider is provided. The method includes receiving registration information from a mobile device indicating that a communications manager is authorized to act on behalf of the mobile device for certain communications between the mobile device and the content provider. Further, the method includes registering the content provider with the communications manager thus allowing the communications manager to communicate with the content provider and receiving modified user preferences for the content provider from the mobile device. The method additionally includes communicating to the content provider the modified user preferences.

In a second aspect of the present invention, a system is provided for managing communications between a user and a content provider. The system includes a communications server for receiving and processing alerts that are intended for a mobile device and that are sent from one or more content providers based on the mobile device's subscription to the alerts associated with the one or more content providers. The system further includes a communications manager for managing communications with the one or more content providers on behalf of the mobile device, the communications comprising user preferences regarding alerts received from the one or more content providers. The mobile device is registered with the communications manager and provides the communications manager with a carrier identification, a list of accounts and access information for the one or more content providers, and notification services for each of the one or more content providers for which the communications manager is authorized to act on behalf of the mobile device. Each of the one or more content providers is registered with the communications manager thus allowing the communications manager to communicate the user preferences that are specific to the content provider on behalf of the mobile device.

In a third aspect of the present invention, computer-readable media having computer-executable instructions embodied thereon that, when executed, enable a computing device to perform a method of managing communications between a user and a content provider is provided. The method includes receiving registration information from a mobile device indicating the content providers with which a communications manager is authorized to communicate on behalf of the mobile device. The mobile device has registered with the content provider and has provided the content provider with user preferences corresponding to alerts in the form of short messaging services (SMS) text messages received from the content provider. The method further includes establishing an agreement with the content provider allowing the communications manager to communicate with the content provider on behalf of the mobile device regarding the alerts. The agreement is specific to the content provider such that it indicates how the communications manager is to communicate with the content provider. Additionally, the method includes receiving a request from the mobile device to modify the user preferences corresponding to the alerts received from the content provider and translating the request from the mobile device to a content provider-specific format consistent with the agreement. The method also includes communicating the request in the content provider-specific format to the content provider.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
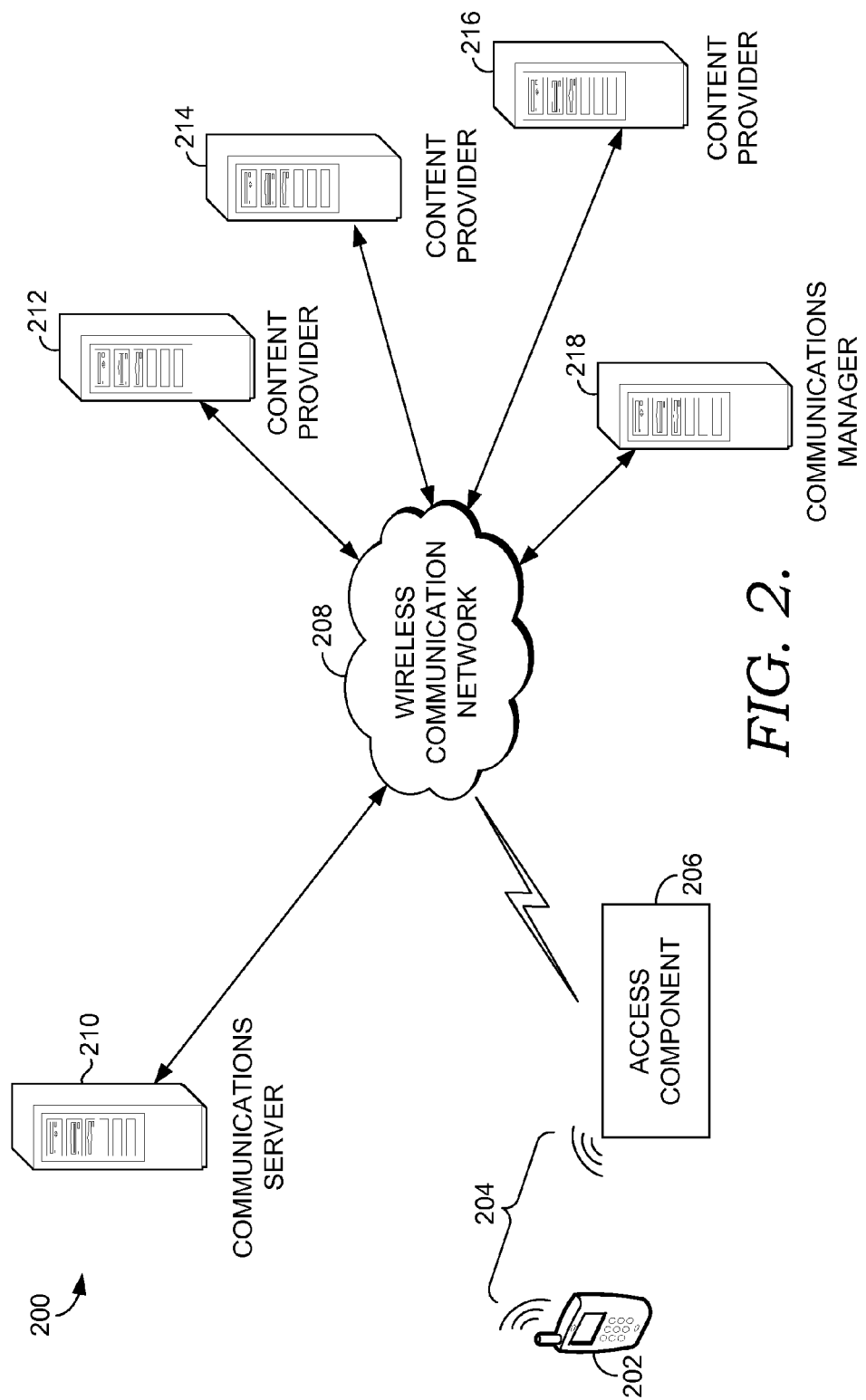
FIG. 2 depicts an illustrative operating system for carrying out embodiments of the present invention.

FIG. 2 depicts an illustrative operating environment, referenced generally by the numeral 200, and illustrates an illustrative networking environment that enables management of communication between a user and a content provider. Mobile device 202, in one embodiment, is the type of device described in connection with FIG. 1 herein. It may include a client application that helps carry out aspects of the technology described herein. The client application may be a resident application on the handset, a stand-alone web-site, or a combined application/web offering that the user uses to communicate with the communications manager. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. In one embodiment, the client application communicates modified user preferences through a wireless communications network 208 to a communications manager 218 to allow for the communications manager 218 to communicate with a content provider on behalf of the mobile device 202.

Mobile device 202 communicates with an access component 206 by way of a communications link 204. Communications link 204 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a WiFi connection to a device (e.g., mobile hotspot) that provides access to a wireless communications network, such as a WLAN connection using 802.11 protocol. A long-range connection may include a connection using one or more of CDMA, GPRS, GSM, TDMA, and 802.16.

Generally, the access component 206 provides access to what some skilled artisans refer to as a wireless communications network 208, also termed a core network. A wireless communications network 208 may comprise one or more of the components illustrated in FIG. 2. To the contrary, not all components that make up a wireless communications network are shown. Also, not all connections or possible connections are shown. The access component 206 may be one or more of a base transceiver station (BTS) tower, a WiFi Router, a Mobile Hotspot, and any other device that facilitates communication between mobile device 202 and network 208. In one embodiment, the access component 206 includes both a WiFi Router and a BTS tower. In another embodiment, access component 206 is a BTS tower. A radio network controller (RNC) (not shown) performs various functions, such as managing radio channels, power control, load control, admission control, packet scheduling, handover control, macrodiversity, security functions, and mobility management. A base station controller (BSC) (not shown) acts as the intelligence behind base transceiver stations (BTS) (not shown), and handles allocation of radio channels, receives measurements from mobile devices, and controls handovers from one BTS to another BTS.

The components illustrated in FIG. 2 include a communications server 210, content providers 212, 214, and 216, and a communications manager 218. As mentioned, other components not shown here may also be used to carry out aspects of the present invention. Further, several components shown in FIG. 2 may be combined into a single component although shown separately in FIG. 2. The components illustrated in FIG. 2 may communicate with one another by way of the wireless communications network 208.

As mentioned, some components are not depicted in FIG. 2 so as to not obscure aspects of the various embodiments of the present invention. For instance, the wireless communications network 208 may include various components that are not shown. One of these components is a network-access gateway (not shown) that helps facilitate communication between the mobile device 202 and other networks (not shown) as well as the Internet (not shown). The network-access gateway is also known by some skilled artisans as a packet data serving node (PDSN). Similarly, others might refer to this device as a foreign agent. The network-access gateway helps manage communications sessions between the mobile device 202 and other components, such as the communications server 210, the communications manager 218, the content providers 212, 214, and 216, and the like. Any device that provides similar functionality is contemplated within the scope of this disclosure. For example, a GSM offers similar functionality in networks that utilize GSM or UMTS technology.

At a high level, the network-access gateway helps provide access to the Internet as well as to other network technologies and application services. It helps provide mobile IP (MIP) access, one-agent support, and transportation of packets to facilitate the funneling or communicating of data through virtual private networks. It can act as a client for an authentication server (not shown), which helps ensure that mobile device 202 is authorized to communicate via the wireless telecommunications network. In some embodiments, the authentication server is known as an authentication, authorization, and accounting (AAA) server. But it can be any device that helps authenticate mobile device 202. In one embodiment, a network-access gateway includes a set of computer executable instructions that helps carry out various aspects of technology described herein. Further, a home agent (not shown) may be included in the embodiment of FIG. 2. A home agent is a router on the mobile device's 202 home network that maintains information about the device's current location, which, in one embodiment, is identified in a care-of-address. This allows the mobile device 202 to keep the same IP address even when it connects from a different location. In one instance, the home agent works in conjunction with a foreign agent.

Generally, in this disclosure, when we speak of communicating data or information we are referring to any action that requires mobile device 202 to have an IP address in order to carry out some action. Mobile device 202 might attempt to access items such as the Internet as well as other components that might alone or in combination facilitate things such as television reception, e-mail reception, picture mail, video mail, video conferencing, and the like.

The communications server 210 is a server that is responsible for managing incoming and outgoing messages, such as SMS messages, from mobile devices to other mobile devices, applications, and services. In one embodiment, the communications server 210 is a Short Message Service center (SMSC). Typically, alerts, notifications, and other such messages sent by content providers are first communicated to the communications server 210 prior to being delivered to individual mobile devices. The communications server 210 may monitor the types of messages (e.g., alerts, notifications) sent from the content providers to the mobile devices in the network. Further, modification events, as described further herein, may also be sent through the communications server.

The communications manager 218 is generally responsible for managing the communications between mobile devices and content providers. More specifically, the communications manager 218 manages user preferences for, for example, messages (e.g., alerts, notifications) received by mobile devices by content providers. As such, if a user indicates that he or she no longer wishes to receive particular alerts from a particular content provider, these modified user preferences may be sent to the communications manager 218, which, by way of its previously received registration with the particular content provider, knows how to communicate with that content provider to disable or enable certain alerts sent from the content provider. A mobile device, such as mobile device 202, has the option to register with the communications manager 218 to indicate its current user preferences with respect to receiving messages from various content providers. These user preferences may be included in a registration of the user of the mobile device 202 with the communications manager 218. The user preferences may include, for exemplary purposes only, an identification of the mobile device, identifications of the content providers that the communications manager 218 is authorized to communicate with on behalf of the mobile device, login information (e.g., username, password) for each content provider specific to the user of the mobile device, user preferences, etc. When the user wishes to change these preferences, the mobile device 202 communicates a modification event, which includes modified user preferences, to the communications manager 218. In one embodiment, the modification event is first sent to the communications server 210, and then to the communications manager 218. In one embodiment, the communications manager 218 is associated with a particular carrier or service provider, but in another embodiment, the communications manager 218 is not associated with any particular carrier or service provider and may provide its services for mobile devices in various networks.

Content providers 212, 214, and 216 represent various applications, services, etc., that are available via the wireless communications network 208. For instance, gaming applications, weather applications, messaging services, and social media outlets are just a few of the many types of content providers contemplated to be within the scope of the present invention. Oftentimes, these content providers 212, 214, and 216 send out messages, such as SMS messages to registered users. The content providers 212, 214, and 216 may also broadcast e-mails, voicemails, and other forms of communication to mobile devices associated with users who are registered with the particular content provider. Users may opt in or opt out of receiving these messages or other forms of communications. The process of opting in and opting out can be quite time-consuming and burdensome for a user, as the user would need to access the particular content provider and from there determine how to opt in or out of particular messages. In some instances, the user may not even be able to opt in and out of particular messages using a website, for instance, associated with a content provider. Further, managing these notifications can be difficult and cumbersome, and end users are often unsure of how to opt out, or are unable to opt out of these notifications. In many cases, end users rely on mechanisms such as flagging notifications and advertisements as unwanted or spam, which merely prevents the messages from being forwarded to the mobile device, but leaves both the content provider and the service provider (e.g., communications server) burdened by a large volume of zero-value messages that still impact network capacity and cost of service. As such, one of the major issues is that even if the user relies on flagging or similar methods of preventing unwanted messages, the messages are still delivered to the service provider, which incurs a cost to block these messages on its own messaging infrastructure, and which can involve significant volume that otherwise carries no value and is better and more efficiently addressed by having the source content provider stop sending additional and unwanted message. The communications manager 218 resolves these issues by acting on behalf of the mobile device 202 to opt in or out of messages for a particular content provider.

Turning now to FIG. 3, a flow diagram is depicted of a method 300 for managing communications between a user and a content provider, in accordance with an embodiment of the present invention. Initially, the components illustrated in FIG. 3 include a mobile device 304, a communications server 306, a communications manager 308, and a content provider 310. The mobile device 304 communicates 312 registration information 314 to the communications manager 308. Generally, the communication of registration information allows the user of the mobile device to set up preferences with the communications manager 308, thus allowing the communications manager 308 to communicate with the content provider(s) 310 on behalf of the mobile device 304. The registration information 314 may include, for instance, PTN/MDN, the cellular carrier, an identification of the user, an identification of the mobile device, an identification of the content providers (e.g., social networking accounts, notification services, news feeds, alerts), login information (e.g., username, password) for these content providers, allowed applications, nonallowed applications, notification services for each content provider that the user of the mobile device 304 wants the communications manager 308 to act on his or her behalf, and the like. In one embodiment, the registration information may simply be a message sent from the mobile device 304 indicating that the user would like to update his or her user preferences corresponding to the content provider 310. For instance, when the user purchased the mobile device 304, the user may have registered with the communications manager 308, but now would like to update these user preferences. The registration information 314 allows the communications manager 308 to act on behalf of the mobile device 304 and learn what it is and isn't allowed to do.

At step 316, the communications manager 308 stores the registration information 314 on a data store. The content provider 310 then communicates 318 a registration 320 to the communications manager 308. This registration 320 allows the communications manager 308 to understand how to opt in and opt out of messages with that particular content provider 310. For instance, each content provider 310 may have its own website, particular codes, etc. that the communications manager 308 would use to opt in or out of messages on behalf of a user. Further, particular types of notifications or alerts may be associated with a particular code. The registration 320 ensures that the communications manager 308 knows how to properly communicate opt in, opt out, or other information with each content provider 310.

Once the content provider 310 is registered with the communications manager 308, the mobile device 304 communicates 322 an alert registration 324 to the content provider 310 notifying the content provider 310 as to which alerts, notifications, or other messages the mobile device 304 would like to subscribe to and receive. It should be noted that the alert registration 324 may be communicated to the content provider 310 before or after the registration 320 of the content provider 310 with the communications manager 308, or even before or after the user, by way of the mobile device 304, has communicated registration information 314 to the communications manager 308. The alert registration 324 may include specific types of alerts or notifications that the user would like to receive, such as messages related to a particular topic or group. At step 316, the content provider 310 saves the alert registration information so that it can be recalled in the future. Once an alert or other message is to be sent to the mobile device based on the alert registration 324, the content provider 310 communicates 328 an alert 330 to the communications server 306. As mentioned, alerts are typically first sent to a component within the mobile device's network before being sent to the mobile device 304 itself. In one embodiment, a service provider or carrier may monitor which messages are blocked for each mobile device, but others may not. Here, the communications server 306 receives the alert 330 and communicates 332 the alert 334 to the mobile device 304.

Anytime after the alert 334 is received by the mobile device 304, the user of the mobile device 304 may determine that he or she no longer wishes to receive alerts from the content provider 310. Alternatively, the user may wish to not receive only a specific type of alert from the content provider 310. The mobile device 304 then communicates 336 a modification event 338 to the communications server 306 so that the carrier or service provider is aware of the modification event 338. The modification event 338, in one embodiment, is an indication from the mobile device 304 that the user wishes to modify user preferences in relation to alerts, notifications, or other such messages received from the content provider 310. In one embodiment, the modification event 338 is a block message for blocking all alerts or certain types of alerts from the content provider 310. Modifying user preferences may include opting in or out from certain alerts, or from all alerts from a particular content provider 310. The communications server 306 communicates 340 the modification event 342 to the communications manager 308 so that the communications manager 308 can communicate the modification event to the content provider 310. Prior to communicating the modification event 342 to the content provider 310, the communications manager 308 translates the modification event 342 into a content provider-specific format, or a format that is compatible with the content provider 310. This is shown at step 344. Compatibility information is learned when the registration 320 is communicated to the communications manager 308, as previously discussed. Further, at step 344, the communications manager 308 may access a data store to determine if it is authorized to act on behalf of the particular mobile device 304 in relation to the particular content provider 310. The communications manager 308 may also determine whether it has a relationship with the content provider 310 (e.g., determine whether a registration has been received).

The communications manager 308 then communicates 346 a modification message 348 to the content provider 310. The content provider 310 processes this information and makes the necessary changes to comply with the modification message 348 at step 350. The content provider 310 communicates 352 a modification confirmation 354 to the communications manager 308, which then communicates 356 the modification confirmation 358 to the communications server 306, which then communicates 360 the modification confirmation 362 to the mobile device 304. The modification confirmation provides an indication that the user preferences have been updated with the content provider 310.

For exemplary purposes only, user X may receive a status update from a social media network, which may be associated with the short code 123456. User X may send a carrier-specific short code blocking command over SMS so that no further SMS messages are delivered from short code 123456, or the social media site. The carrier message platform detects that the short code 123456 associated with the SMS block belongs to the social media site. Detecting that user X is a subscriber of the service described herein, the carrier, on behalf of user X, integrates with the social media site through either a negotiated API or the traditional HTTP, and sets user X's preferences on the social media site to no notifications.

Alternatively, embodiments of the present invention may be used by entities to potentially block employees from subscribing to certain notifications and receiving such notifications while at work. The communications manager 308 would provide these capabilities such that only a list of approved notifications could be received by employees while at work.

Referring to FIG. 4, a flowchart illustrates a method 400 for managing communications between a user and a content provider, in accordance with an embodiment of the present invention. Initially, at step 410, registration information is received from a mobile device. Receipt of the registration information indicates that a communications manager to which the information is sent is authorized to act on behalf of the mobile device for certain communications between the mobile device and a content provider. The content provider registers with the communications manager at step 412, thus allowing the communications manager to communicate with the content provider. This registration provides the communications manager with the understanding of specific codes and specific mechanisms for that particular content provider.

Modified user preferences are received at the communications manager from the mobile device at step 414. Modified user preferences may comprise, for instance, terminal identifiers and termination codes that allow the user to opt in or opt out of receiving messages from the content provider. In one instance, the messages received from the content provider are SMS text messages. As mentioned, the user preferences or modification events may be received by way of a user interface that allows the user to communicate user preferences for multiple content providers with the communications manager. At step 416, the modified user preferences are communicated to the content provider. The user preferences may be translated into mobile notification preference setting commands specific to the particular content provider before being communicated to that content provider. In one embodiment, a confirmation message, such as a modification confirmation, is received from the content provider indicating that the user preferences have been modified.

FIG. 5 depicts a flowchart illustrating a method for managing communications between a user and a content provider, in accordance with an embodiment of the present invention. Initially, registration information is received from a mobile device at step 510. The registration information identifies the content providers with which a communications manager is authorized to communicate on behalf of the mobile device. The mobile device is registered with the content provider and has provided the content provider with user preferences corresponding to alerts in the form of SMS text messages that the user wishes to receive from the content provider. At step 512, an agreement is established with the content provider allowing the communications manager to communicate with the content provider on behalf of the mobile device regarding the received alerts. The agreement is specific to the content provider such that it indicates how the communications manager is to communicate with the content provider, such as content provider-specific codes and the like.

At step 514, a request is received from the mobile device to modify the user preferences for alerts received from the content provider. The request is translated to a content provider-specific format at step 516, consistent with the agreement. At step 518, the translated request is communicated to the content provider. In one embodiment, the translated request is communicated to the content provider by way of an application programming interface (API) or a website associated with the content provider.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, enable a computing device to perform a method of managing communications between a user and a content provider, the method comprising:

receiving registration information from a mobile device indicating that a communications manager is authorized to act on behalf of the mobile device for certain communications between the mobile device and the content provider, wherein the communications manager communicates modified user preferences for content provider services based in part on an agreement established between the communications manager and the content provider for communicating user preferences;

registering the content provider with the communications manager thus allowing the communications manager to communicate with the content provider on behalf of the mobile device;

receiving the modified user preferences for the content provider from the mobile device; and communicating to the content provider the modified user preferences, such that, the modified user preferences received from the mobile device are translated into mobile notification preference setting commands specific to the content provider.

2. The non-transitory media of claim 1, further comprising receiving a confirmation message from the content provider indicating that the user preferences have been modified.

3. The non-transitory media of claim 1, wherein the communications manager is not associated with a particular service provider.

4. The non-transitory media of claim 1, wherein the modified user preferences comprise one or more of the user opting in or the user opting out of receiving messages from the content provider.

5. The non-transitory media of claim 4, wherein the messages are short messaging services (SMS) text messages.

6. The non-transitory media of claim 1, wherein the user is provided with a user interface for communicating the user preferences for multiple content providers with the communications manager.

7. The non-transitory media of claim 1, wherein the modified user preferences comprise terminal identifiers and termination codes.

8. The non-transitory media of claim 1, wherein the modified user preferences comprise an identification associated with one or more of the user of the mobile device or the mobile device.

9. The non-transitory media of claim 1, wherein the communications manager tracks messaging subscriptions associated with the mobile device and various content providers.

10. A system for managing communications between a user and a content provider, the system comprising:

a communications server for receiving and processing alerts that are intended for a mobile device and that are sent from one or more content providers based on the mobile device's subscription to the alerts associated with the one or more content providers content providers;

a communications manager for managing communications one or more content providers on behalf of the mobile device, based on an agreement established between the communications manager and each of the one or more content providers, the communications comprising user preferences regarding alerts received from the one or more content providers, (1) wherein the mobile device is registered with the communications manager and provides the communications manager with a carrier identification, a list of accounts and access information for the one or more content providers, and notification services for each of the one or more content providers for which the communications manager is authorized to act on behalf of the mobile device, and (2) wherein each of the one or more content providers is registered with the communications manager thus allowing the communications manager to communicate the user preferences that are specific to the content provider on behalf of the mobile device; and the mobile device having a processor and a memory, the mobile device receiving alerts from the one or more content providers and communicating to the communications manager modified user preferences regarding the alerts received from the one or more content providers.

11. The system of claim 10, wherein the alerts are short messaging services (SMS) text messages.

12. The system of claim 10, wherein the communications manager stores the user preferences.

13. Non-transitory computer-readable media having computer-executable instructions embodied thereon that, when executed, enable a computing device to perform a method of managing communications between a user and a content provider, the method comprising:

receiving registration information from a mobile device indicating the content providers with which a communications manager is authorized to communicate on behalf of the mobile device, wherein the mobile device has registered with the content provider and has provided the content provider with user preferences corresponding to alerts in the form of short messaging services (SMS) text messages received from the content provider;

establishing an agreement with the content provider allowing the communications manager to communicate with the content provider on behalf of the mobile device regarding the alerts, wherein the agreement is specific to the content provider such that it indicates how the communications manager is to communicate with the content provider;

receiving a request from the mobile device to modify the user preferences corresponding to the alerts received from the content provider;

translating the request from the mobile device to a content provider-specific format consistent with the agreement; and communicating the request in the content provider-specific format to the content provider.

14. The non-transitory media of claim 13, wherein the request includes an identification of the mobile device.

15. The non-transitory media of claim 13, wherein the communications manager communicates the request comprising the modified user preferences to the content provider by way of one or more of an application programming interface (API) or a website associated with the content provider.

16. The non-transitory media of claim 13, wherein translating the request from the mobile device to the content provider-specific format comprises accessing a data store to determine a code specific to the content provider, the code corresponding to a particular modification to the user preferences.

17. The non-transitory media of claim 13, wherein the modified user preferences indicate that a user of the mobile device is unregistering from receiving all of the alerts from a particular content provider.

18. The non-transitory media of claim 13, wherein the modified user preferences indicate that a user of the mobile device is unregistering from receiving certain types of the alerts from a particular content provider.

* * * * *